United States Patent [19]

Mallow et al.

[11] Patent Number: 4,663,067
[45] Date of Patent: May 5, 1987

[54] TRANSIENT SOIL EROSION AND EVAPORATION PALLIATIVE COMPOSITION AND METHOD

[75] Inventors: William A. Mallow; Robert P. Wood, both of San Antonio, Tex.

[73] Assignee: Earth Protection Systems, Inc., San Antonio, Tex.

[21] Appl. No.: 793,663

[22] Filed: Oct. 31, 1985

[51] Int. Cl.[4] ............................................... C09K 3/22
[52] U.S. Cl. ....................................... 252/88; 106/900
[58] Field of Search .......................... 252/88; 106/900

[56] References Cited

U.S. PATENT DOCUMENTS

| | | | |
|---|---|---|---|
| 2,448,605 | 9/1948 | Kleinicke | 252/88 |
| 4,038,443 | 7/1977 | Jacoby | 252/88 |

FOREIGN PATENT DOCUMENTS

| | | |
|---|---|---|
| 2524899 | 10/1983 | France . |
| 23994 | of 1907 | United Kingdom . |
| 823597 | 4/1981 | U.S.S.R. . |

*Primary Examiner*—Paul Lieberman
*Assistant Examiner*—Hoa Van le
*Attorney, Agent, or Firm*—Sigalos & Levine

[57] ABSTRACT

A sprayable composition for forming a transient film for controlling soil erosion and moisture evaporation consisting essentially of an alkali metal silicate, a liquid, an environmentally degradable moisture vapor barrier-forming material selected from elastomers, aliphatic hydrocarbons, animal and vegetable fats, hydrogenated oils and mixtures thereof, and an agent for stabilizing said composition and the method of controlling soil erosion and moisture evaporation utilizing the aforesaid composition.

4 Claims, No Drawings

TRANSIENT SOIL EROSION AND EVAPORATION PALLIATIVE COMPOSITION AND METHOD

BACKGROUND OF THE INVENTION

It has been estimated that over 20 billion tons of arable soil are removed from farming areas annually by wind and/or rain erosion and swept into rivers, lakes, and seas. This type of erosion is not only damaging to the arable soil in the physical sense and in terms of its depleting it with respect to certain chemicals and organic matter necessary to support plant life, but it also presents a problem when the soil has been planted. The blown wind tends to abrade the emerging plants and causes great damage to them particularly in areas that are dry.

Moreover, it has been known that removal of the fertilizers from the soil to lakes, rivers and the like has had tremendous adverse effects on aquatic life in that the organic and inorganic matter deposited often causes extreme damage to fish and aquatic plants.

The problem is made even more severe in fairly arid areas where there is extensive moisture loss from the planted soils.

Many efforts have been made to minimize both the erosion of the soil and the moisture loss from the soil involving a variety of compositions known to form barrier layers on the soil and ameliorate the soil erosion and evaporation problem. The difficulty however has been that the cost of utilizing such products is prohibitive, it being clear that the addition of hundreds of dollars of costs per acre to eliminate this problem is a prohibitive cost the farmers who can barely now afford the other costs involved in surviving the economics problem in farming.

Moreover, the products presently used present the problem in some cases of being damaging to the soil either in terms of leaving residual materials behind such as fluoride which are toxic to plant life or in having effects on the soil, such as hardening, making it therefore difficult to reuse the soil for revegetation.

Heretofore there has not been any suitable transient low-cost soil erosion and evaporation material that can be applied to agriculture areas which is also environmentally sound; that is to say, that it is biologically compatible with the soils and the crops. In addition, it is required not only to have a low-cost material but one that can be applied with relative ease and simplicity; preferably with existing apparatus in agricultural use such as conventional sprayers.

SUMMARY OF THE INVENTION

The present invention overcomes these problems to provide a low-cost and effective soil erosion and evaporation palliative which is environmentally degradable and compatible with soils and crops.

Briefly stated, the present invention comprises a sprayable composition for controlling soil erosion and moisture evaporation consisting essentially of a dust inhibitor, a liquid, an environmentally degradable moisture vapor barrier-forming material selected from elastomers, aliphatic hydrocarbons, animal and vegetable fats and oils and hydrogenated oils, and an agent for stabilizing said composition.

The invention also comprises the method of stabilizing soil utilizing such composition.

DETAILED DESCRIPTION

Broadly stated, the present invention combines a unique combination of soil erosion and dust inhibitors, moisture vapor barrier materials, and stabilizing agents for the same to provide environmentally degradable compositions which have a transient effect and are of low cost.

With respect to the dust inhibitors, while any environmentally compatible inhibitor can be used; preferred is an alkali metal silicate and particularly sodium silicates such as $Na_2SiO_3$, $Na_6Si_2O_7$, and $Na_2Si_3O_7$, hydrated to various water level contents usually containing about $5H_2O$, or mixtures thereof. There is no need to add the silicates in dry form but solutions of such silicates can be used; such aqueous solutions are commonly known as water glass. It is also possible to use components which will react in a liquid, such as water, to form the desired silicate.

As to the moisture vapor barrier, any environmentally degradable material can be used such as elastomers, aliphatic hydrocarbons, animal and vegetable fats, and hydrogenated oils, and mixtures thereof, so long as such material is capable of forming a film on the surface of soil. Since the composition containing the barrier material is used in the form of a solution or dispersion, then, of course, as the liquid is removed from such composition the barrier material must be capable of precipitating therefrom to form a film. With respect to the elastomeric materials, latexes such as polyvinyl acetate, styrene-butadiene and the like are preferred. As to the aliphatic hydrocarbons, it is preferred to use material such as paraffinic oils (mineral oils), bituminous emulsions such as coal tar pitch, bitumens, petroleum bottoms, and asphaltic compounds. Such materials when placed in the soil can be environmentally degraded. The last main groups are the animal and vegetable fats and hydrogenated oils with the most suitable from a cost viewpoint being tallow obtained as a waste in the rendering of animal fats. Other suitable materials in this group that can be used are coconut oil, corn oil, and sunflower oil.

The stabilizing agent used is a combination of a dispersant and a surfactant.

Suitable as dispersants are colloidal or finely divided silicas such as diatomaceous silica, fumed silica, and silica flour, fly ash, powdered limestone, and combinations thereof, and clays such as betonite or the like.

The surfactant used can be anionic, cationic, or nonionic with commercial blends thereof being useful. Such blends are commonly used in detergent composition such as TIDE and DAWN which can be used as can other commercial detergents. Other suitable surfactants are the alkylated aryl polyether alcohols (TRITON X-100 and TERGITOL TMN), sodium lauryl sulfate (DUPONAL ME), and the sodium salts of napthalene sulfonic acids condensed with aldehydes (TAMOL 731. Polysorbates (TWEENs and SPANs) with HLB balanced to the oil and water combination of the instant composition can be used. Other suitable surfactants, sometimes characterized as emulsifiers, are ammonium caseinate, sodium tallate, polyvinyl alcohol, and mixtures thereof.

From a cost viewpoint the most economic systems are a combination of ammonium caseinate and polyvinyl alcohol with clay; sodium lauryl sulfate with clay, or a combination of TAMOL 731 and TRITON X-100 with silica.

The liquid used to form the dispersion is preferably water because it is non-toxic and inexpensive.

With respect to proportions, they can vary widely depending upon the particular problem in any given area. That is to say, in those areas where a dust and soil erosion is due primarily to wind activity and evaporation is not as serious a problem, larger amounts of the dust-inhibiting material can be used; whereas, in those areas where wind erosion is not as serious a problem as moisture vapor evaporation and damage from rain, then a larger proportion of the water barrier material can be utilized.

Within these broad parameters, however, it has been found that typical and most suitable compositions contain, for each 100 parts by weight, the following ingredients and proportions by weight:

|  | Parts by Weight | |
| --- | --- | --- |
|  | Operative | (Solids) Preferred |
| Dust inhibitor | 30-70 | 40-60 |
| Moisture vapor barrier material | 15-50 | 20-40 |
| Liquid | 5-30 | 10-20 |
| Stabilizing Agent | | |
| (a) Dispersant | 0.5-4 | 1-3 |
| (b) Surfactant | 0.2-3 | 0.25-2 |

Sufficient water is added to ensure that a substantially homogeneous aqueous dispersion is formed and that the proportions of dust inhibitor and moisture vapor barrier material can be applied at levels necessary to give the intended transient effect.

As has been previously indicated, the instant compositions are intended to be transient in effect and primarily to prevent soil erosion and moisture losses of plowed areas or planted or seeded areas. For this reason for optimum results and economy the composition should be applied after planting, irrigation, and fertilization have been completed and upon the peaks of the planted furrows where the seeding is applied. It can be applied, as noted, simply using the conventional spraying apparatus conventionally available and utilized for the purpose of either spraying water and/or liquid fertilizers on crops. After being applied to the soil and as the water evaporates from the dispersion the materials form into a continuous film tend to stratify with the sodium silicate forming a bottom layer tending to temporarily bind the surface grains of soil and an upper layer of the moisture barrier material which tends to prevent the moisture, which can readily penetrate through the silicate layer, from escaping from the soil to the air. Hardening to form the film is also accomplished in part by the reaction of the composition components with soil chemicals such as the organic acids and polyvalent minerals thereof, as well as the components from fertilizers used, such as the ammonium salts of sulfuric and phosphoric acid.

By spraying on the peaks of planted furrows any rain which falls would tend to go into the furrows and migrate along that path and would not affect the seeds or the young seedlings as they pass through these layers. It must be candidly stated however that any initial heavy rainfall will clearly wash away the protective coating layers formed by the instant compositions since they are indeed intended to have a transient effect. They also act to keep the dust from blowing as the plants are young to prevent the abrasion damage to plants and/or seedlings due thereto and at the same time to keep the moisture in the soil to ensure that the same will get the maximum amount of moisture and that a large percentage of the moisture in the soil is not lost to the atmosphere.

However, after some weeks of application when most crops, plants, or seedlings have come to a point where their root systems are established and can hold the soil and water, and the foliage shades the soil against solar heating to minimize water evaporation, the coatings will be broken up and dispersed and the soil can then be treated in the usual manner thereafter for either replanting of a second crop or to lie fallow until such time as the next planting is to be made.

It will be understood that the materials such as the sodium silicate are harmless in the soil and that the moisture vapor barrier materials in like manner over time are environmentally degraded either by the water (hydrolysis) and/or air (oxidation) in the surrounding environment or by the action of microorganisms in the soil. Therefore even if some of the components of the instant compositions are washed into streams, lakes and the like they have no environmentally polluting effect such as compositions which contain fluoride, chlorides, phosphates or other possible toxic substances.

The invention will be further described in connection with the following examples which are set forth for purposes of illustration only.

EXAMPLE 1

A dispersion was formed by admixing the below listed materials in a suitable vessel:

|  | Parts by Weight |
| --- | --- |
| Water glass | 400 |
| Water | 200 |
| Mineral oil (TELURA 323) | 50 |
| Polyvinyl acetate (GELVA TS100) | 15 |
| Stabilizing Agent: | |
| (a) Bentonite | 10 |
| (b) Sodium lauryl sulfate (DUPONAL ME) | 10 |

The resultant dispersion was sprayed onto soil and formed a hardened film which acted to prevent soil erosion and moisture loss.

EXAMPLE 2

A dispersion was formed by admixing the following materials:

|  | Parts by Weight |
| --- | --- |
| Sodium Silicate hydrous powder (BRITESIL GA) | 400 |
| Water | 200 |
| Tallow | 50 |
| Stabilizing Agent: | |
| (a) finely divided silica | 10 |
| (b) Sodium salt of napthalene sulfonic acid condensed with aldehydes (TAMOL 731) | 5 |
| (c) Alkylated aryl polyether alcohol (TRITON X-100) | 5 |

The resultant dispersion was sprayed onto soil and formed a hardened film which acted to prevent soil erosion and moisture loss.

EXAMPLE 3

A dispersion is formed by admixing the below listed materials in a suitable vessel:

|  | Parts by Weight |
| --- | --- |
| Water glass | 400 |
| Water | 200 |
| Coconut oil | 50 |
| Stabilizing Agent: |  |
| (a) fly ash | 10 |
| (b) ammonium caseinate | 10 |
| (c) polyvinyl alcohol | 10 |

The resultant dispersion can be sprayed onto soil to form a hardened film which will act to prevent soil erosion and moisture loss.

EXAMPLE 4

The formulation of the dispersion of Example 3 is used to form a series of dispersions except that for the coconut oil used therein there is substituted separately and in turn an equal amount of corn oil, sunflower oil, petroleum bottoms, bitumens, and blends with renderings from meat processing plants. In each case a suitable hardened film is formed.

EXAMPLE 5

The formulation of the dispersion of Example 3 is used to form a series of dispersions except that for the fly ash used therein there is substituted separately and in turn an equal amount of silica flour, powdered limestone, diatomaceous silica, fumed silica, and a mixture of the foregoing. In each case a suitable hardened film is formed.

EXAMPLE 6

The formulation of the dispersion of Example 3 is used to form a series of dispersions except that for the ammonium caseinate and polyvinyl alcohol used therein there is substituted separately and in turn 5 parts by weight of alkylated aryl polyether alcohol (TERGITOL TMN), TIDE, and DAWN. In each case a suitable hardened film is formed.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A sprayable composition for forming a transient film for controlling soil erosion and moisture evaporation consisting essentially of, for each 100 parts by weight thereof based on solids, from about 30 to 70 parts of an alkali metal silicate, about 15 to 50 parts of an environmentally degradable moisture vapor barrier-forming material selected from elastomers, aliphatic hydrocarbons, animal and vegetable fats, hydrogenated oils and mixtures thereof, an agent for stabilizing said composition, and water; said stabilizing agent consisting essentially of about 0.5 to 4 parts of a dispersant selected from a silica or a clay and about 0.2 to 3 parts of a surfactant.

2. The composition of claim 1 wherein the dispersant is a clay and the surfactant is selected from sodium lauryl sulfate or a combination of ammonium caseinate and sodium tallate.

3. The composition of claim 1 wherein the dispersant is a silica and the surfactant is a combination of a alkylated aryl polyether alcohol and a sodium salt of napthalene sulfonic acid condensed with aldehydes.

4. A sprayable composition for forming a transient film for controlling soil erosion and moisture evaporation consisting essentially of, for each 100 parts by weight of solids of the composition, from about 40 to 60 parts of a hydrated sodium silicate, about 20 to 40 parts aminal fats, a stabilizing agent, and water; said stabilizing agent consisting essentially of about 1 to 3 parts of a dispersant selected from a silica or a clay and about 0.25 to 2 parts of a surfactant selected from sodium lauryl sulfate, an alkylated aryl polyether alcohol, a sodium salt of napthalene sulfonic acid condensed with aldehydes or mixtures thereof.

* * * * *